US012217661B2

(12) United States Patent
Lee et al.

(10) Patent No.: US 12,217,661 B2
(45) Date of Patent: Feb. 4, 2025

(54) DISPLAY DEVICE

(71) Applicant: Samsung Display Co., LTD., Yongin-si (KR)

(72) Inventors: Bongwon Lee, Yongin-si (KR); Dongsoo Kim, Yongin-si (KR); Hyungjun Park, Yongin-si (KR); Hyun-Chol Bang, Yongin-si (KR); Young-Soo Yoon, Yongin-si (KR); Taehyoung No, Yongin-si (KR); Yun-Kyeong In, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/489,996

(22) Filed: Oct. 19, 2023

(65) Prior Publication Data

US 2024/0169900 A1 May 23, 2024

(30) Foreign Application Priority Data

Nov. 18, 2022 (KR) ........................ 10-2022-0155448

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0297* (2013.01)

(58) Field of Classification Search
None
See application file for complete search history.

(56) References Cited

U.S. PATENT DOCUMENTS

| | | | | |
|---|---|---|---|---|
| 11,328,676 | B2 * | 5/2022 | Hyeon | H10K 77/111 |
| 2018/0292698 | A1 * | 10/2018 | Koide | G06F 3/0446 |
| 2020/0082758 | A1 * | 3/2020 | Yi | G09G 3/3275 |
| 2020/0202784 | A1 * | 6/2020 | Kim | G09G 3/3291 |

FOREIGN PATENT DOCUMENTS

| | | |
|---|---|---|
| KR | 10-0603456 | 7/2006 |

* cited by examiner

*Primary Examiner* — Christopher J Kohlman
(74) *Attorney, Agent, or Firm* — KILE PARK REED & HOUTTEMAN PLLC

(57) ABSTRACT

A display device includes a substrate including a display area and a non-display area adjacent to the display area, a plurality of pixels disposed on the display area of the substrate, and a switching unit disposed on the non-display area of the substrate, connected to each of the plurality of pixels, and including a plurality of first demultiplexers and a plurality of second demultiplexers having sizes different from sizes of the plurality of first demultiplexers.

19 Claims, 9 Drawing Sheets

DISPLAY DEVICE

CROSS-REFERENCE TO RELATED APPLICATION(S)

This application claims priority to and benefits of Korean Patent Application No. 10-2022-0155448 under 35 USC § 119, filed on Nov. 18, 2022, in the Korean Intellectual Property Office (KIPO), the entire contents of which are incorporated herein by reference.

BACKGROUND

1. Technical Field

Embodiments relate to a display device with a demultiplexer.

2. Description of the Related Art

A display device displays an image by including a driving element (e.g., a transistor) and a light emitting element (e.g., an organic light emitting diode) that emits light by receiving a voltage or signal from the driving element. In order to provide the voltage or signal to the light emitting elements, a driver, line, and the like are disposed in a non-display area of the display device.

An image is not displayed in the non-display area where the light emitting elements are not disposed. The non-display area in which an image is not displayed is referred to as a dead space.

SUMMARY

Embodiments provide a display device capable of reducing a dead space (or non-display area).

However, embodiments of the disclosure are not limited to those set forth herein. The above and other embodiments will become more apparent to one of ordinary skill in the art to which the disclosure pertains by referencing the detailed description of the disclosure given below.

A display device according to an embodiment may include a substrate including a display area and a non-display area adjacent to the display area, a plurality of pixels disposed on the display area of the substrate, and a switching unit disposed on the non-display area of the substrate, connected to each of the plurality of pixels, and including a plurality of first demultiplexers and a plurality of second demultiplexers having sizes different from sizes of the plurality of first demultiplexers.

In an embodiment, the display area may include a first display area and a second display area adjacent to at least one side of the first display area, and the second display area may include a rounded corner portion.

In an embodiment, the switching unit may include a first switching unit adjacent to the first display area and a second switching unit adjacent to the second display area.

In an embodiment, the first switching unit may include the plurality of first demultiplexers, and the second switching unit may include the plurality of second demultiplexers.

In an embodiment, the second switching unit may be disposed along the rounded corner portion of the second display area.

In an embodiment, widths of the plurality of first demultiplexers may be greater than widths of the plurality of second demultiplexers.

In an embodiment, heights of the plurality of second demultiplexers may be greater than heights of the plurality of first demultiplexers.

In an embodiment, pixels adjacent to an outer edge portion of the display area among the plurality of pixels may be arranged in a stepwise manner.

In an embodiment, each of the plurality of first demultiplexers and the plurality of second demultiplexers may include at least one transistor.

In an embodiment, a number of transistors included in the plurality of first demultiplexers and a number of transistors included in the plurality of second demultiplexers may be same as each other.

In an embodiment, the display device may further include a plurality of data lines disposed on the substrate, extending in a first direction, and connected to each of the plurality of pixels.

In an embodiment, the switching unit may be connected to each of the plurality of pixels through the plurality of data lines.

In an embodiment, the display device may further include a plurality of scan lines disposed on the substrate, extending in a second direction intersecting the first direction, and connected to each of the plurality of pixels.

A display device according to an embodiment may include a substrate including a first display area, a second display area adjacent to at least one side of the first display area and a non-display area adjacent to the first and second display areas, a plurality of pixels disposed on each of the first and second display areas of the substrate, and a switching unit disposed on the non-display area of the substrate and including a plurality of demultiplexers. The switching unit may include a first switching unit adjacent to the first display area and connected to the plurality of pixels disposed in the first display area and a second switching unit adjacent to the second display area and connected to the plurality of pixels disposed in the second display area. The plurality of demultiplexers included in the second switching unit may be arranged in a stepwise manner.

In an embodiment, the second display area may include a rounded corner portion.

In an embodiment, the plurality of demultiplexers included in the second switching unit may be arranged in the stepwise manner along the rounded corner portion of the second display area.

In an embodiment, pixels adjacent to an outer edge portion of the plurality of second display area among the plurality of pixels may be arranged in a stepwise manner.

In an embodiment, the display device may further include a plurality of data lines disposed on the substrate, extending in a first direction, and connected to each of the plurality of pixels. Each of the first and second switching units may be connected to the plurality of pixels through the plurality of data lines.

In an embodiment, the display device may further include a plurality of scan lines disposed on the substrate, extending in a second direction intersecting the first direction, and connected to each of the plurality of pixels.

In an embodiment, the plurality of demultiplexers may include at least one transistor.

In a display device according to embodiments, the display device may include a first switching unit and a second switching unit disposed on a lower side of the display device. The first switching unit may include a plurality of first demultiplexers, and the second switching unit may include a plurality of second demultiplexers having different sizes from sizes of the plurality of first demultiplexers. As widths of the plurality of first demultiplexers are greater than widths of the plurality of second demultiplexers and heights of the plurality of second demultiplexers are greater than heights of the plurality of first demultiplexers, a dead space (or non-display space) of the lower side of the display device may be reduced.

As the plurality of demultiplexers included in the second switching unit are arranged stepwise along a rounded corner portion of a display area, the dead space (or non-display space) of the lower side of the display device may be reduced.

DETAILED DESCRIPTION OF THE EMBODIMENTS

Figure 1:
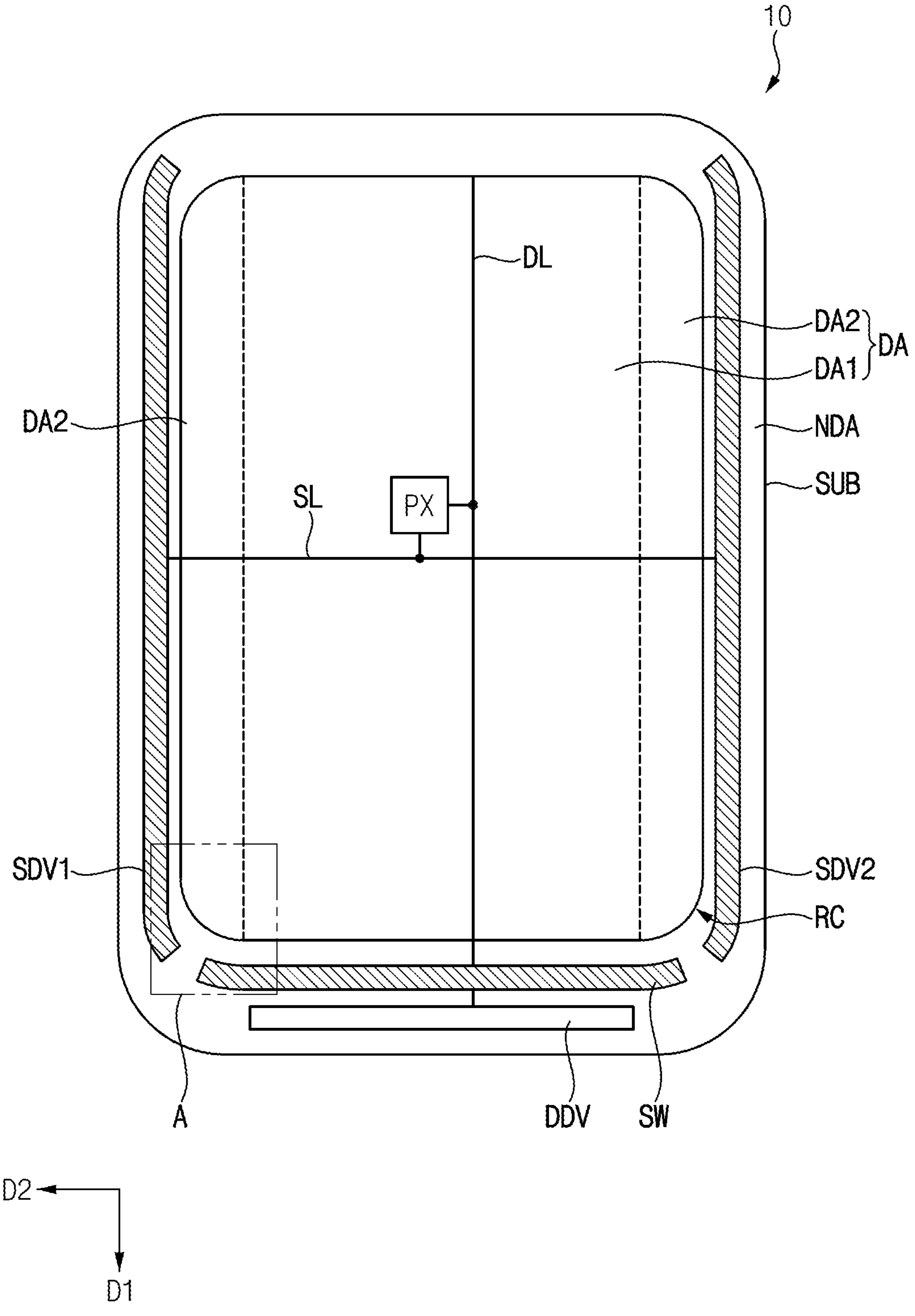
FIG. 1 is a schematic plan view of a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the X, Y, and Z-axes, and may be interpreted in a broader sense. For example, the D1-axis, the D2-axis, and the D3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

FIG. 1 is a schematic plan view of a display device according to an embodiment.

Referring to FIG. 1, a display device 10 may include a substrate SUB. A display area DA and a non-display area NDA adjacent to the display area DA may be defined on the substrate SUB.

The display area DA may be an area that displays an image by generating light, and the non-display area NDA may be an area that does not display an image.

Pixels PX that emit light may be disposed in the display area DA, and accordingly, an image may be displayed in the display area DA. The pixels PX may be arranged in a matrix form along a first direction D1 and a second direction D2 intersecting the first direction D1. For example, the second direction D2 may be substantially perpendicular to the first direction D1. Each of the pixels PX may include a light emitting element (e.g., a light emitting element LD of FIG. 2) and a pixel circuit (e.g., a pixel circuit PC of FIG. 2) that drives the light emitting element. In an embodiment, the light emitting element may include an organic light emitting diode, and the pixel circuit may include at least one thin film transistor.

Lines, which provide voltages or signals to the pixels PX, may be disposed in the display area DA. For example, data lines DL and scan lines SL may be disposed in the display area DA.

Each of the data lines DL may extend along the first direction D1, and may be arranged along the second direction D2. The data lines DL may supply a data signal to each of the pixels PX.

Each of the scan lines SL may extend along the second direction D2, and may be arranged along the first direction D1. The scan lines SL may supply a scan signal to each of the pixels PX.

In an embodiment, the display area DA may include a first display area DA1 and a second display area DA2 adjacent to at least one side of the first display area DA1. For example, the second display area DA2 may be adjacent to both left and right sides of the first display area DA1. For example, the second display area DA2 may be adjacent to the first display area DA1 in the second direction D2 and in a direction opposite to the second direction D2. In an embodiment, the second display area DA2 may include a rounded corner portion RC. For example, the rounded corner portion RC may be a part of a circle formed with a constant curvature, and may be defined at corner portions of the display area DA, respectively. For example, a shape of the display area DA may be a rectangular shape with rounded corner portions, e.g., in a plan view. However, the shape of the display area DA is not limited thereto, and the display area DA may have various shapes, e.g., in a plan view.

The non-display area NDA may surround at least a portion of the display area DA. For example, the non-display area NDA may surround (e.g., entirely surround) the display area DA. Drivers, which display an image of the display area DA, may be disposed in the non-display area NDA. For example, the drivers may include a data driver DDV which generates the data signal and first and second scan drivers SDV1 and SDV2 which generate the scan signal.

The data driver DDV may be disposed on a lower side of a plane of the display device 10. For example, the data driver DDV may be spaced apart from the display area DA in the first direction D1. The data driver DDV may generate the data signal, and may supply the data signal to the data lines DL. In an embodiment, the data driver DDV may be implemented as one or more integrated circuits (ICs). In another example, the data driver DDV may be disposed outside the display device 10 and electrically connected to the display device 10.

The first and second scan drivers SDV1 and SDV2 may be disposed on left and right sides of the plane of the display device 10. For example, the first scan driver SDV1 may be spaced apart from the display area DA in the second direction D2, and the second scan driver SDV2 may be spaced apart from the display area DA in the direction opposite to the second direction D2. The first and second scan drivers SDV1 and SDV2 may generate the scan signal, and may supply the scan signal to the scan lines SL. In an embodiment, the first and second scan drivers SDV1 and SDV2 may be implemented as one or more integrated circuits.

The switching unit SW may be disposed in the non-display area NDA, and may be disposed on the lower side of the plane of the display device 10. For example, the switching unit SW may be spaced apart from the display area DA in the first direction D1. For example, the switching unit SW may be disposed between the display area DA and the data driver DDV. The switching unit SW may demux the data signal, and may supply the data signal to the data lines DL.

Figure 2:
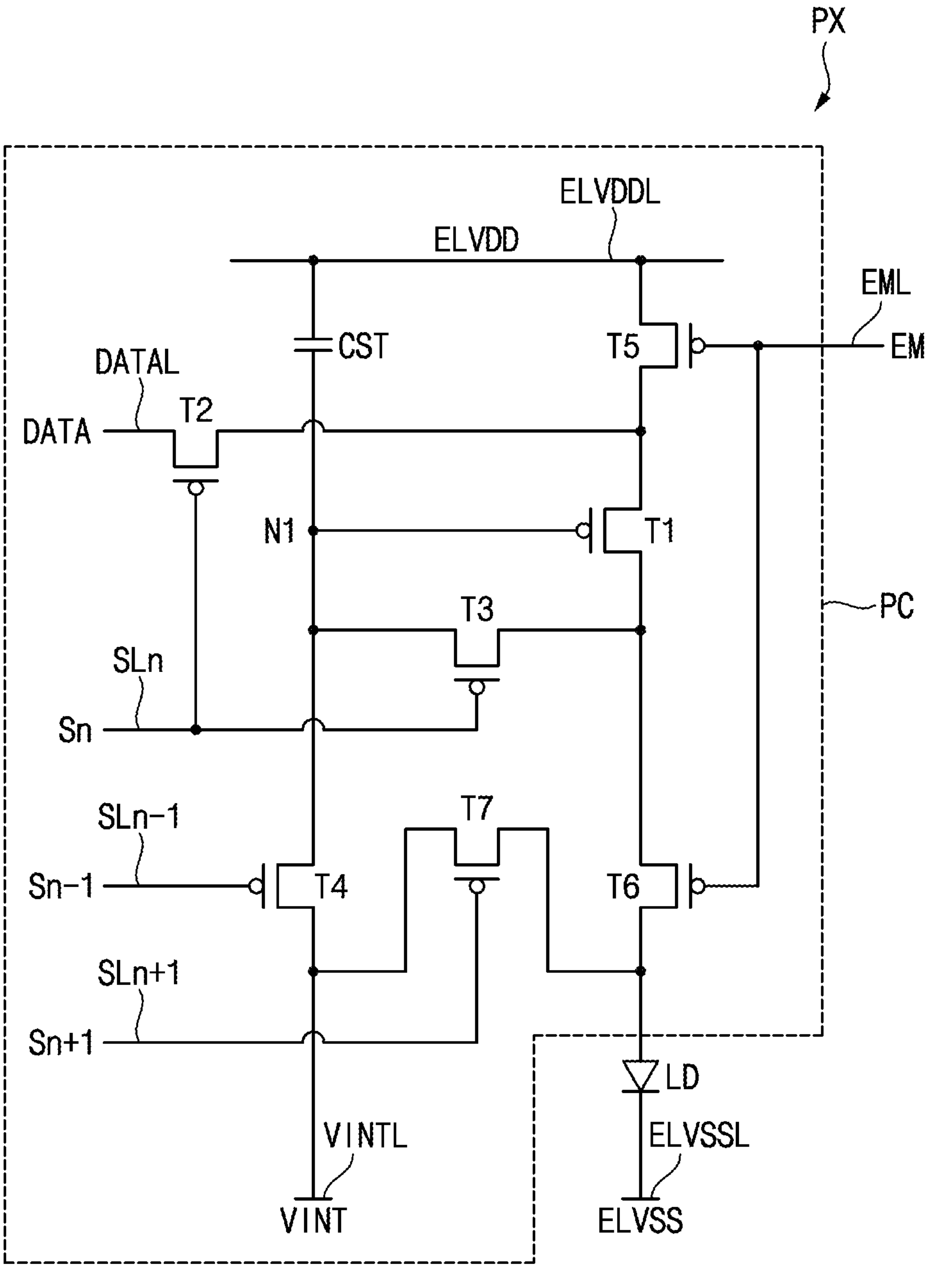
FIG. 2 is a schematic diagram of an equivalent circuit of an example of a pixel included in the display device of FIG. 1.

FIG. 2 is a circuit diagram of an example of a pixel included in the display device of FIG. 1.

Referring to FIG. 2, the pixel PX may include a light emitting element LD and a pixel circuit PC which drives the light emitting element LD.

The pixel circuit PC may include a driving thin film transistor T1, a switching thin film transistor T2, a compensation thin film transistor T3, a first initialization thin film transistor T4, a first light emitting control thin film transistor T5, a second light emitting control thin film transistor T6, a second initialization thin film transistor T7, a storage capacitor CST, a driving voltage line ELVDDL for supplying a driving voltage ELVDD, a common voltage line ELVSSL for supplying a common voltage ELVSS, a data signal line DATAL for supplying a data signal DATA, an initialization voltage line VINTL for supplying an initialization voltage VINT, a first scan signal line SLn for supplying a first scan signal Sn, a second scan signal line SLn−1 for supplying a second scan signal Sn−1, a third scan signal line SLn+1 for supplying a third scan signal Sn+1, and a light emitting control signal line EML for supplying a light emitting control signal EM.

A drain terminal of the driving thin film transistor T1 may be connected to the light emitting element LD via the second light emitting control thin film transistor T6. The driving thin film transistor T1 may receive the data signal DATA according to a switching operation of the switching thin film transistor T2, and may supply a driving current to the light emitting element LD.

A gate terminal of the switching thin film transistor T2 may be connected to the first scan signal line SLn, and a source terminal of the switching thin film transistor T2 may be connected to the data signal line DATAL. A drain terminal of the switching thin film transistor T2 may be connected to a source terminal of the driving thin film transistor T1. The drain terminal of the switching thin film transistor T2 may be connected to the driving voltage line ELVDDL via the first light emitting control thin film transistor T5. The switching thin film transistor T2 may be turned on according to the first scan signal Sn transmitted through the first scan signal line SLn, and may perform the switching operation of transmitting the data signal DATA transmitted through the data signal line DATAL to the source terminal of the driving thin film transistor T1.

A gate terminal of the compensation thin film transistor T3 may be connected to the first scan signal line SLn. A source terminal of the compensation thin film transistor T3 may be connected to the drain terminal of the driving thin film transistor T1. The source terminal of the compensation thin film transistor T3 may be connected to a first terminal of the light emitting element LD via the second light emitting control thin film transistor T6. A drain terminal of the compensation thin film transistor T3 may be connected to a first terminal of the storage capacitor CST, a source terminal of the first initialization thin film transistor T4 and the gate terminal of the driving thin film transistor T1. The compensation thin film transistor T3 may be turned on according to the first scan signal Sn transmitted through the first scan signal line SLn, and may diode-connect the driving thin film transistor T1.

A gate terminal of the first initialization thin film transistor T4 may be connected to the second scan signal line SLn−1. A drain terminal of the first initialization thin film transistor T4 may be connected to the initialization voltage line VINTL. The source terminal of the first initialization thin film transistor T4 may be connected to the first terminal of the storage capacitor CST, the drain terminal of the compensation thin film transistor T3 and the gate terminal of the driving thin film transistor T1. The first initialization thin film transistor T4 may be turned on according to the second scan signal Sn−1 transmitted through the second scan signal line SLn−1, and may perform an initialization operation of initializing a voltage of the gate terminal of the driving thin film transistor T1.

A gate terminal of the first light emitting control thin film transistor T5 may be connected to the light emitting control signal line EML. A source terminal of the first light emitting control thin film transistor T5 may be connected to the driving voltage line ELVDDL. A drain terminal of the first light emitting control thin film transistor T5 may be connected to the source terminal of the driving thin film transistor T1 and the drain terminal of the switching thin film transistor T2.

A gate terminal of the second light emitting control thin film transistor T6 may be connected to the light emitting control signal line EML. A source terminal of the second light emitting control thin film transistor T6 may be connected to the drain terminal of the driving thin film transistor T1 and the source terminal of the compensation thin film transistor T3. A drain terminal of the second light emitting control thin film transistor T6 may be connected to the first terminal of the light emitting element LD. The first light emitting control thin film transistor T5 and the second light emitting control thin film transistor T6 may be simultaneously turned on according to the light emitting control signal EM transmitted through the light emitting control signal line EML, and may transmit the driving voltage ELVDD to the light emitting element LD.

A gate terminal of the second initialization thin film transistor T7 may be connected to the third scan signal line SLn+1. A source terminal of the second initialization thin film transistor T7 may be connected to the first terminal of the light emitting element LD. A drain terminal of the second initialization thin film transistor T7 may be connected to an initialization voltage line VINTL. The second initialization thin film transistor T7 may be turned on according to the third scan signal Sn+1 transmitted through the third scan signal line SLn+1, and may initialize the first terminal of the light emitting element LD.

The first terminal of the storage capacitor CST may be connected to the gate terminal of the driving thin film transistor T1, the drain terminal of the compensation thin film transistor T3 and the source terminal of the first initialization thin film transistor T4. A second terminal of the storage capacitor CST may be connected to the driving voltage line ELVDDL.

The first terminal of the light emitting element LD may be connected to the drain terminal of the second light emitting control thin film transistor T6 and the source terminal of the second initialization thin film transistor T7. A second terminal of the light emitting element LD may be connected to the common voltage line ELVSSL. The light emitting element LD may output light based on the driving current transmitted from the driving thin film transistor T1.

Although the pixel PX is illustrated as including seven thin film transistors and one capacitor in FIG. 2, embodiments are not limited thereto. For example, the pixel PX may have a configuration including at least one thin film transistor and at least one capacitor.

Figure 3:
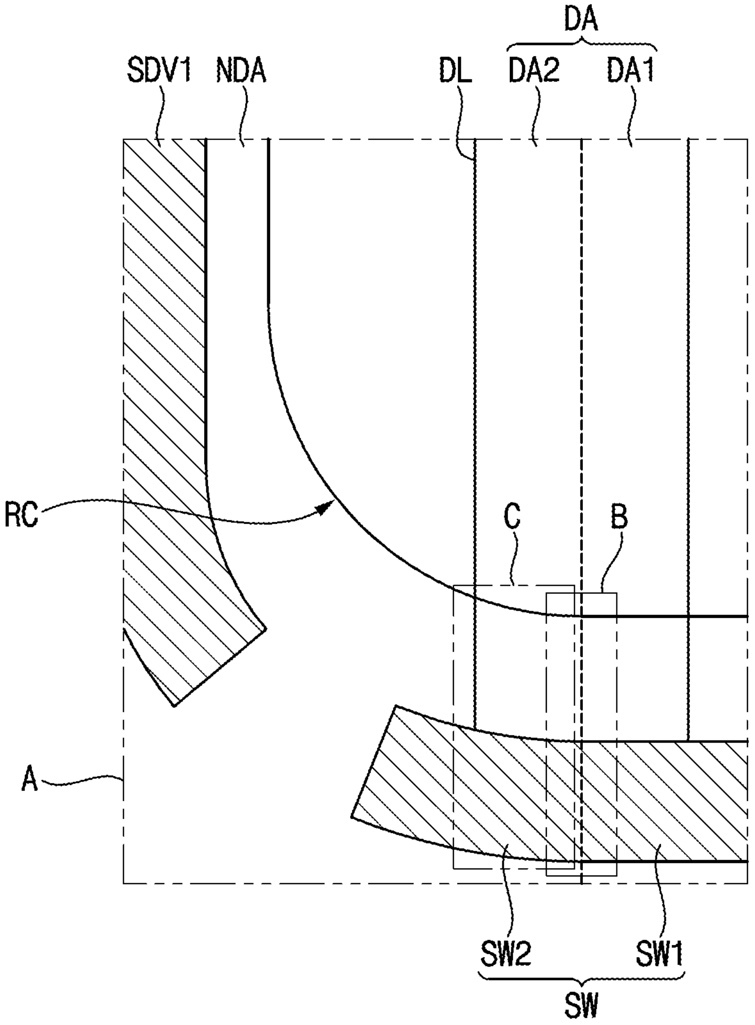
FIG. 3 is an enlarged schematic plan view of an area A of FIG. 1.

FIG. 3 is an enlarged schematic plan view of an area A of FIG. 1. For example, FIG. 3 may be an enlarged schematic plan view of the rounded corner portion RC of the display area DA and the switching unit SW adjacent to the rounded corner portion RC included in the display device 10.

Referring to FIGS. 1 and 3, the display area DA may include the first display area DA1 and the second display area DA2 including the rounded corner portion RC. The second display area DA2 may be adjacent to both left and right sides of the first display area DA1. For example, the first display area DA1 may be defined between the second display areas DA2.

The switching unit SW may be disposed below the display area DA. The switching unit SW may include a first switching unit SW1 and a second switching unit SW2. For example, the first switching unit SW1 may be adjacent to the first display area DA1, and the second switching unit SW2 may be adjacent to the second display area DA2. For example, the first switching unit SW1 and the second switching unit SW2 may be divided based on a boundary area between the first display area DA1 and the second display area DA2. The first switching unit SW1 may be connected to the pixels PX disposed in the first display area DA1 through the data lines DL, and the second switching unit SW2 may be connected to the pixels PX disposed in the second display area DA2 through the data lines DL.

In an embodiment, the second switching unit SW2 may be disposed along the rounded corner portion RC of the second display area DA2. For example, the second switching unit SW2 may have a shape bent toward the rounded corner portion RC of the second display area DA2. However, embodiments are not limited thereto. For example, the second switching unit SW2 may not be disposed along the rounded corner portion RC of the second display area DA2, and may have a straight line shape.

Figure 4:
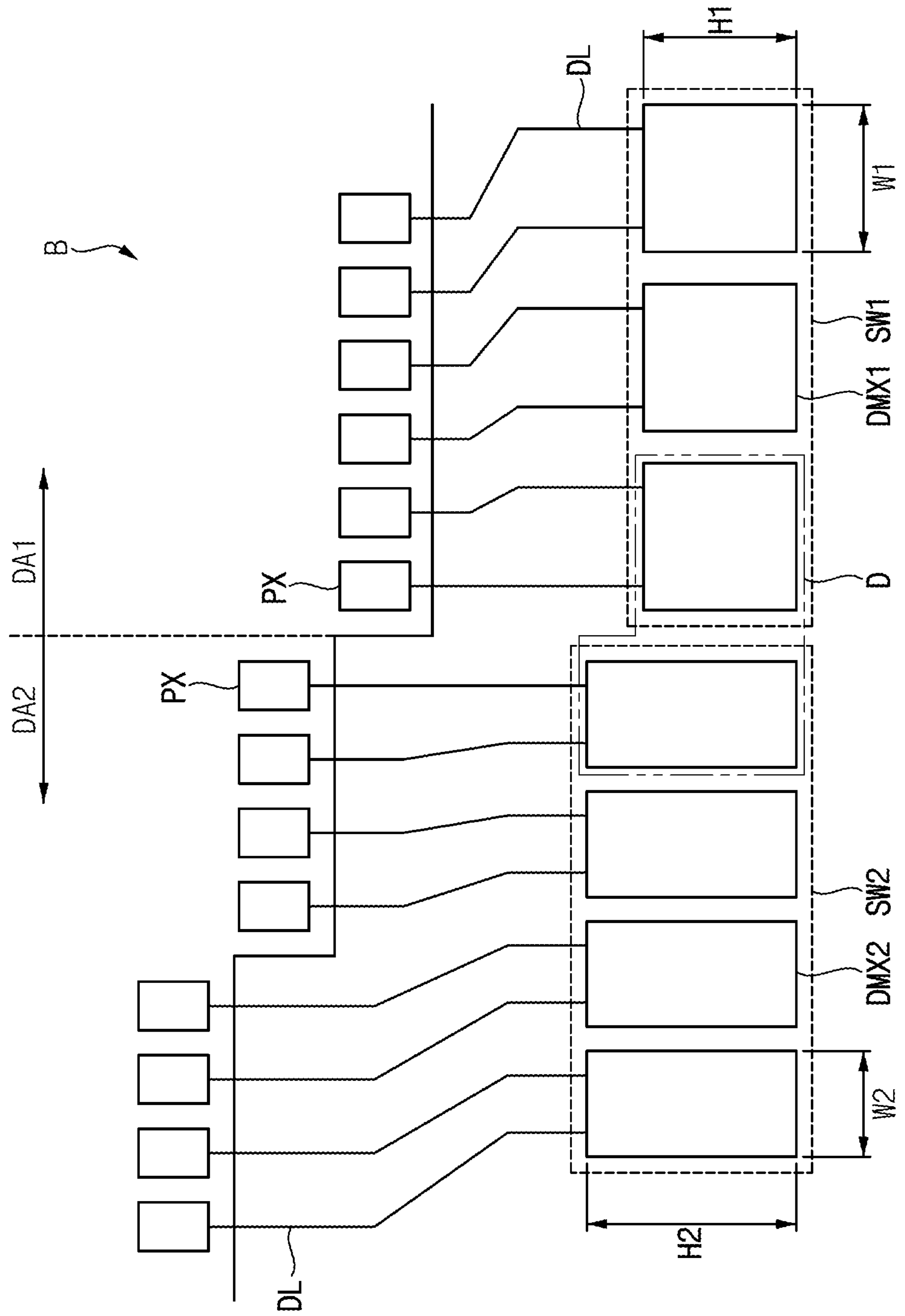
FIG. 4 is an enlarged schematic plan view of an area B of FIG. 3.
Figure 5:
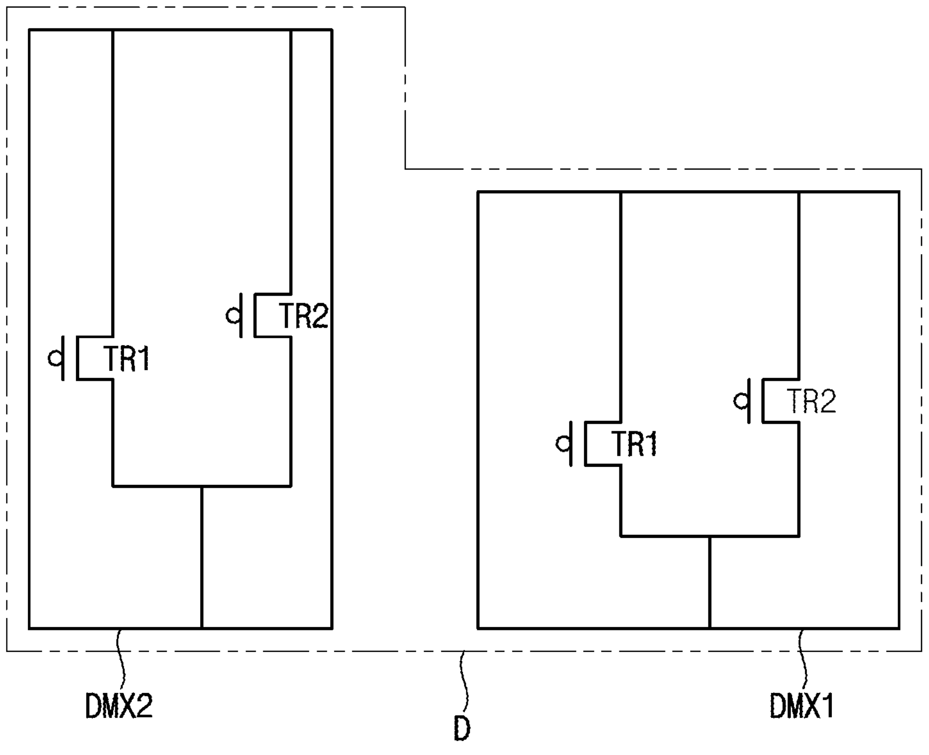
FIG. 5 is an enlarged schematic plan view of an area D of FIG. 4.

FIG. 4 is an enlarged schematic plan view of an area B of FIG. 3. FIG. 5 is an enlarged schematic plan view of an area D of FIG. 4. For example, FIG. 4 may be an enlarged schematic plan view of the first switching unit SW1 and the second switching unit SW2 included in the display device 10, and FIG. 5 may be an enlarged schematic plan view of a first demultiplexer DMX1 included in the first switching unit SW1 and a second demultiplexer DMX2 included in the second switching unit SW2.

Referring to FIGS. 3, 4 and 5, the pixels PX adjacent to an outer edge portion of the display area DA may be arranged in a stepwise manner. For example, the pixels PX disposed in the rounded corner portion RC of the second display area DA2 may be arranged in a stepwise manner.

The first switching unit SW1 may include first demultiplexers DMX1, and the second switching unit SW2 may include second demultiplexers DMX2. Each of the first and second demultiplexers DMX1 and DMX2 may demux the data signal, and may supply the data signal to the data lines DL.

In an embodiment, sizes (e.g., areas) of the first demultiplexers DMX1 may be different from sizes (e.g., areas) of the second demultiplexers DMX2. For example, widths W1 of the first demultiplexers DMX1 may be greater than widths W2 of the second demultiplexers DMX2. For example, heights H2 of the second demultiplexers DMX2 may be greater than heights H1 of the first demultiplexers DMX1.

Each of the first and second demultiplexers DMX1 and DMX2 may include at least one transistor. In an embodiment, the number of transistors included in the first demultiplexers DMX1 and the number of transistors included in the second demultiplexers DMX2 may be the same as each other. For example, each of the first and second demultiplexers DMX1 and DMX2 may include a first transistor TR1 and a second transistor TR2. For example, a size (e.g., area) of the transistor included in the first demultiplexers DMX1 and a size (e.g., area) of the transistor included in the second demultiplexers DMX2 may be the same as each other. For example, a length of a gate line included in the first demultiplexers DMX1 and a length of a gate line included in the second demultiplexers DMX2 may be the same as each other.

Although each of the first and second demultiplexers DMX1 and DMX2 is illustrated as being connected to two data lines DL in FIG. 4, embodiments are not limited thereto. For example, each of the first and second demultiplexers DMX1 and DMX2 may be connected to one or three or more data lines DL.

For example, although each of the first and second demultiplexers DMX1 and DMX2 is illustrated as including two transistors in FIG. 5, embodiments are not limited thereto. For example, each of the first and second demultiplexers DMX1 and DMX2 may include one or three or more transistors.

Figure 6:
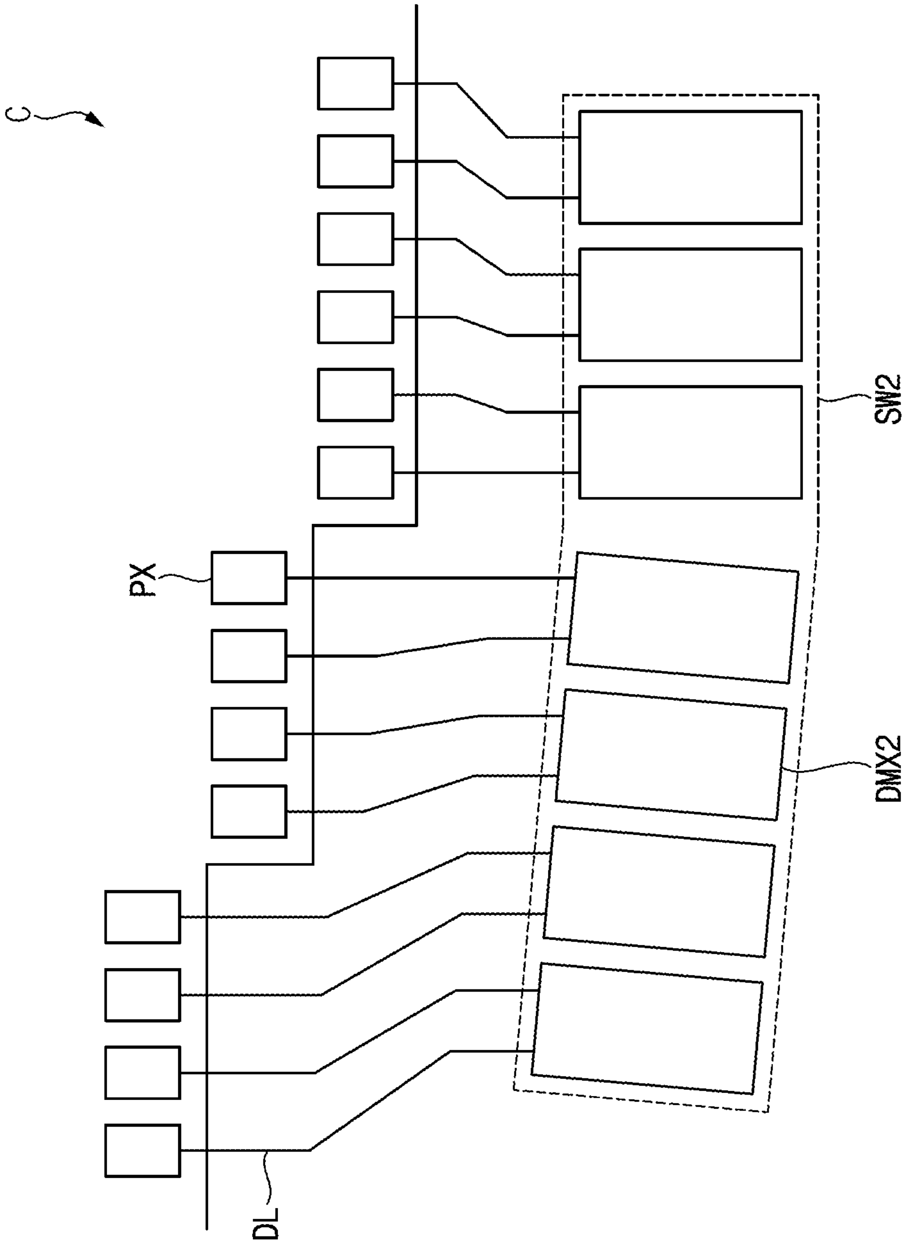
FIG. 6 is an enlarged schematic plan view of an area C of FIG. 3.

FIG. 6 is an enlarged schematic plan view of an area C of FIG. 3. For example, FIG. 6 may be an enlarged schematic plan view of the second switching unit SW2 included in the display device 10.

Referring to FIGS. 3 and 6, the second demultiplexers DMX2 included in the second switching unit SW2 may be disposed along the rounded corner portion RC. For example, the pixels PX disposed in the rounded corner portion RC of the second display area DA2 may be arranged in a stepwise manner, and the second demultiplexers DMX2 may be disposed along the pixels PX arranged in the stepwise manner. Accordingly, the second switching unit SW2 may have the shape bent toward the rounded corner portion RC.

The display device 10 according to an embodiment may include the first switching unit SW1 and the second switching unit SW2 disposed on the lower side of the display device 10. The first switching unit SW1 may include the plurality of first demultiplexers DMX1, and the second switching unit SW2 may include second demultiplexers DMX2 different in size (e.g., area) from the first demultiplexers DMX1. As the widths W1 of the first demultiplexers DMX1 are greater than the widths W2 of the second demultiplexers DMX2, a dead space (or non-display space) below the first display area DA1 may be reduced. For example, as the heights H2 of the second demultiplexers DMX2 are greater than the heights H1 of the first demultiplexers DMX1, a dead space (or non-display space) below the second display area DA2 may be reduced. Accordingly, a dead space (or non-display space) of the lower side of the display device 10 may be reduced.

Figure 7:
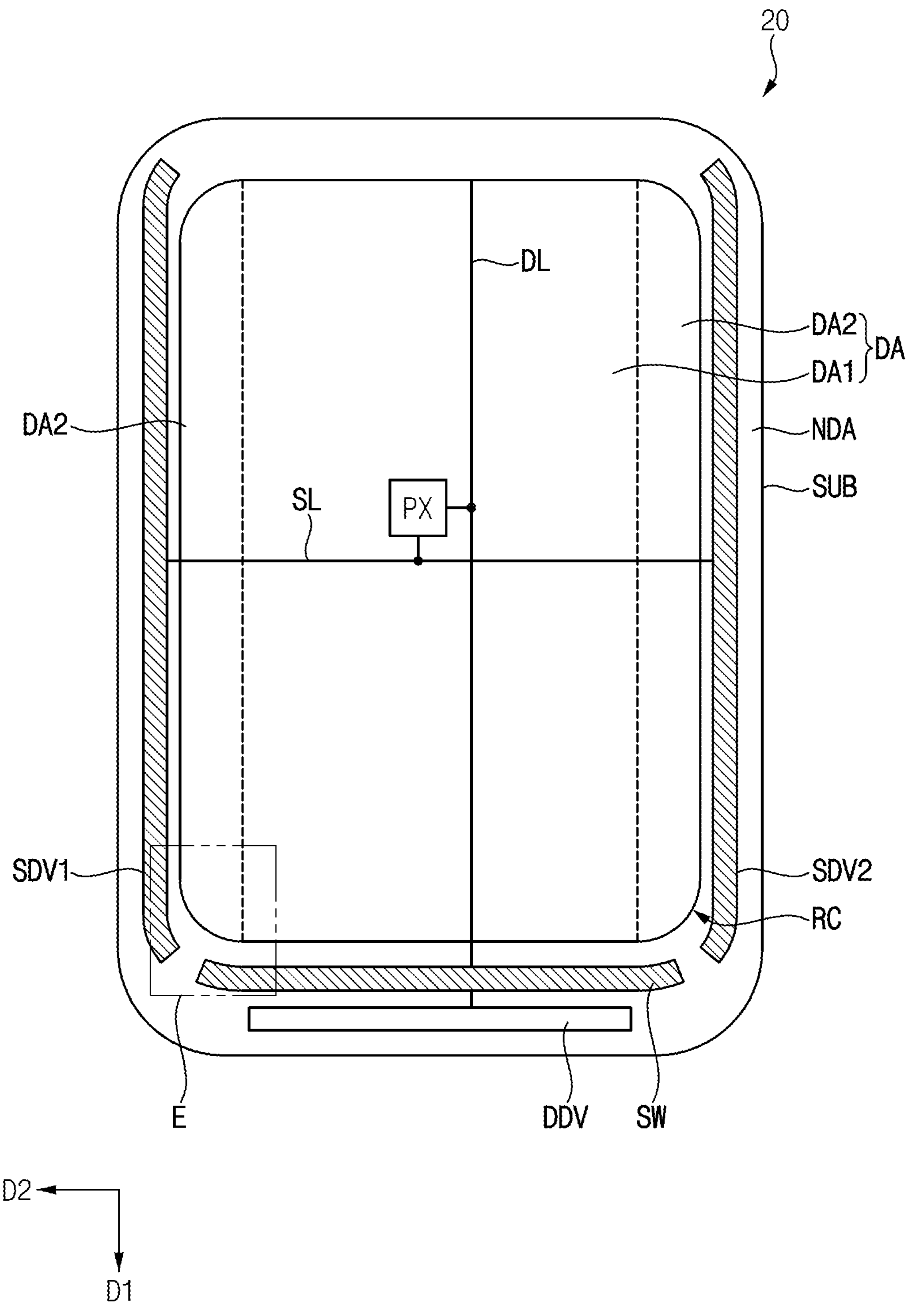
FIG. 7 is a schematic plan view of a display device according to an embodiment.
Figure 8:
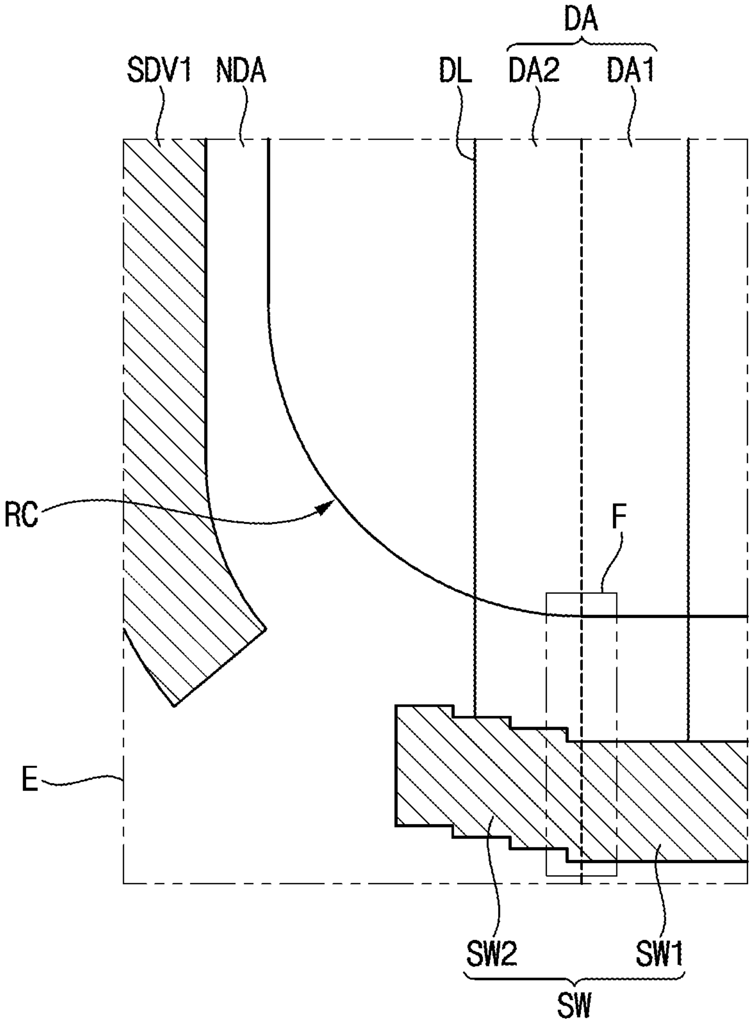
FIG. 8 is an enlarged schematic plan view of an area E of FIG. 7.

FIG. 7 is a schematic plan view of a display device according to an embodiment. FIG. 8 is an enlarged schematic plan view of an area E of FIG. 7. For example, FIG. 8 may be an enlarged schematic plan view of a rounded corner portion RC of a display area DA included in a display device 20 and a switching unit SW adjacent to the rounded corner portion RC.

Hereinafter, redundant descriptions, which are similar to or same as those of the display device 10 described with reference to FIGS. 1, 2, 3, 4, 5 and 6, will be omitted or simplified for descriptive convenience.

Referring to FIGS. 7 and 8, the display device 20 may include a substrate SUB on which the display area DA and a non-display area NDA are defined. The display area DA may include a first display area DA1 and a second display area DA2 including the rounded corner portion RC.

The switching unit SW may be disposed in the non-display area NDA, and may be disposed below the display area DA. The switching unit SW may include a first switching unit SW1 adjacent to the first display area DA1 and a second switching unit SW2 adjacent to the second display area DA2.

In an embodiment, the second switching unit SW2 may be arranged in a stepwise manner along the rounded corner portion RC of the second display area DA2. For example, the second switching unit SW2 may have a shape bent in the stepwise manner toward the rounded corner portion RC of the second display area DA2.

Figure 9:
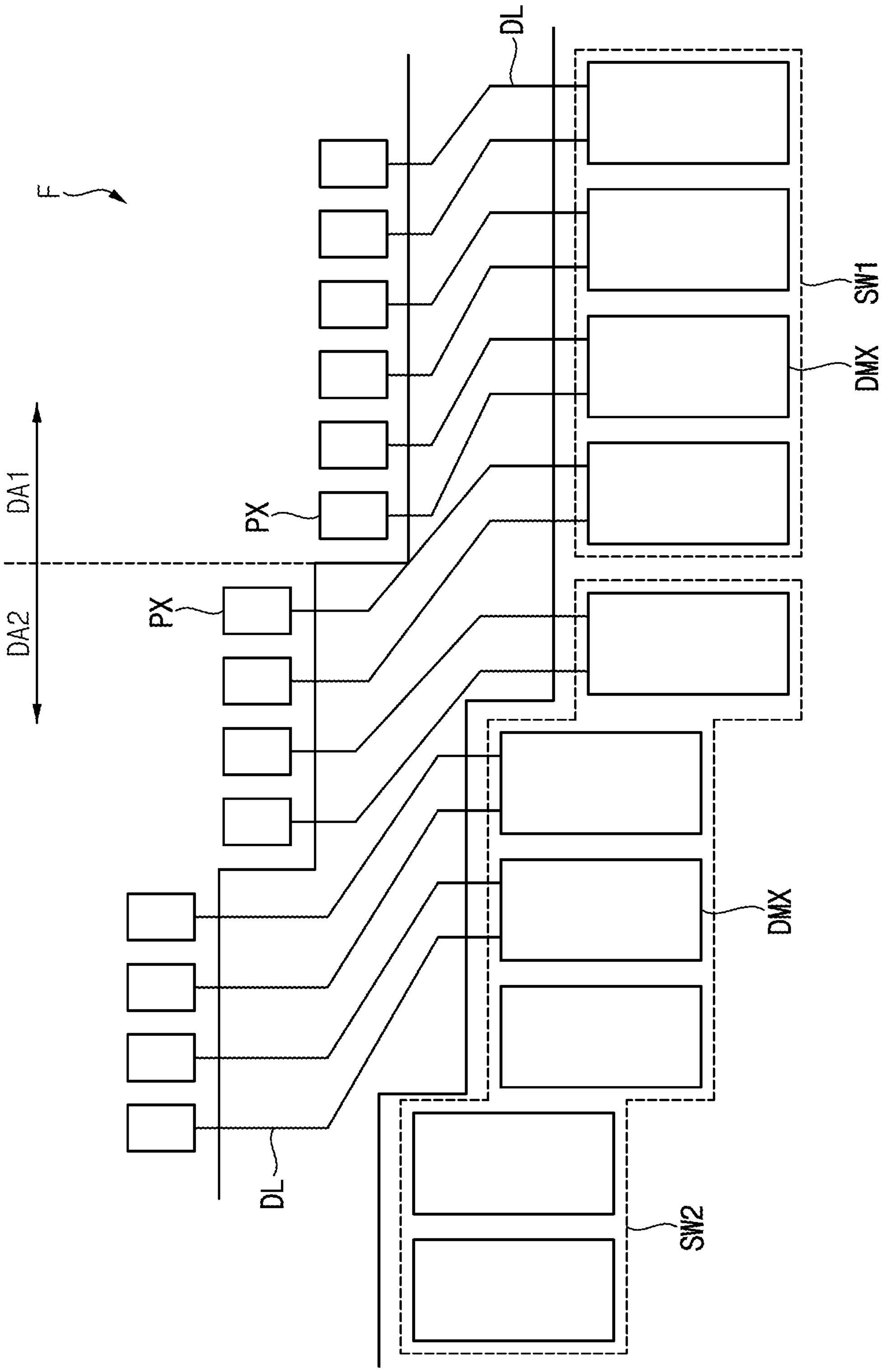
FIG. 9 is an enlarged schematic plan view of an area F of FIG. 8.

FIG. 9 is an enlarged schematic plan view of an area F of FIG. 8. For example, FIG. 9 may be an enlarged schematic plan view of the first switching unit SW1 and the second switching unit SW2 included in the display device 20.

Referring to FIGS. 8 and 9, each of the first switching unit SW1 and the second switching unit SW2 may include demultiplexers DMX.

The pixels PX disposed in the rounded corner portion RC of the second display area DA2 may be arranged in a stepwise manner. In an embodiment, the demultiplexers DMX included in the second switching unit SW2 may be arranged in a stepwise manner along the rounded corner portion RC. Accordingly, the second switching unit SW2 may have the shape bent in the stepwise manner toward the rounded corner portion RC.

The display device 20 according to an embodiment may include the first switching unit SW1 and the second switching unit SW2 disposed on a lower side of the display device 20. Each of the first switching unit SW1 and the second switching unit SW2 may include the plurality of demultiplexers DMX. As the demultiplexers DMX included in the second switching unit SW2 are arranged in a stepwise manner along the rounded corner portion RC of the display area DA, a dead space (or non-display space) of the lower side of the display device 20 may be reduced.

The disclosure can be applied to various display devices. For example, the disclosure is applicable to various display devices such as display devices for vehicles, ships and aircraft, portable communication devices, display devices for exhibition or information transmission, medical display devices, and the like.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
- a substrate including a display area and a non-display area adjacent to the display area;
- a plurality of pixels disposed on the display area of the substrate; and
- a switching unit disposed on the non-display area of the substrate, connected to each of the plurality of pixels, and including a plurality of first demultiplexers and a plurality of second demultiplexers having sizes different from sizes of the plurality of first demultiplexers,
- wherein heights of the plurality of second demultiplexers are greater than heights of the plurality of first demultiplexers.

2. The display device of claim 1, wherein
- the display area includes a first display area and a second display area adjacent to at least one side of the first display area, and
- the second display area includes a rounded corner portion.

3. The display device of claim 2, wherein the switching unit includes:
- a first switching unit adjacent to the first display area; and
- a second switching unit adjacent to the second display area.

4. The display device of claim 3, wherein
- the first switching unit includes the plurality of first demultiplexers, and
- the second switching unit includes the plurality of second demultiplexers.

5. The display device of claim 3, wherein the second switching unit is disposed along the rounded corner portion of the second display area.

6. The display device of claim 1, wherein widths of the plurality of first demultiplexers are greater than widths of the plurality of second demultiplexers.

7. The display device of claim 5, wherein pixels adjacent to an outer edge portion of the display area among the plurality of pixels are arranged in a stepwise manner,
- the second demultiplexers are arranged along the rounded corner portion such that bottom and top surfaces of a first subset of the second demultiplexers are respectively aligned linearly with each other, and are not respectively aligned linearly with a bottom and a top surface of a second subset of the second demultiplexers, wherein none of the second demultiplexers of the first subset are in the second subset,
- the second demultiplexers of the second subset having a shape bent towards the rounded corner portion.

8. The display device of claim 1, wherein each of the plurality of first demultiplexers and the plurality of second demultiplexers includes at least one transistor.

9. The display device of claim 8, wherein a number of transistors included in the plurality of first demultiplexers and a number of transistors included in the plurality of second demultiplexers are same as each other.

10. The display device of claim 1, further comprising:
- a plurality of data lines disposed on the substrate, extending in a first direction, and connected to each of the plurality of pixels.

11. The display device of claim 10, wherein the switching unit is connected to each of the plurality of pixels through the plurality of data lines.

12. The display device of claim 10, further comprising:
- a plurality of scan lines disposed on the substrate, extending in a second direction intersecting the first direction, and connected to each of the plurality of pixels.

13. A display device comprising:
- a substrate including:
  - a first display area,
  - a second display area adjacent to at least one side of the first display area, and
  - a non-display area adjacent to the first and second display areas;
- a plurality of pixels disposed on each of the first and second display areas of the substrate; and
- a switching unit disposed on the non-display area of the substrate and including a plurality of demultiplexers, wherein the switching unit includes:

a first switching unit adjacent to the first display area and connected to the plurality of pixels disposed in the first display area and a second switching unit adjacent to the second display area and connected to the plurality of pixels disposed in the second display area, and the plurality of demultiplexers included in the second switching unit are arranged in a stepwise manner, wherein the plurality of demultiplexers includes a first demultiplexer and a second demultiplexer, and a height of the first demultiplexer is different than a height of the second demultiplexer.

14. The display device of claim 13, wherein the second display area includes a rounded corner portion.

15. The display device of claim 14, wherein the plurality of demultiplexers included in the second switching unit are arranged in the stepwise manner along the rounded corner portion of the second display area.

16. The display device of claim 13, wherein pixels adjacent to an outer edge portion of the second display area among the plurality of pixels are arranged in a stepwise manner.

17. The display device of claim 13, further comprising:

a plurality of data lines disposed on the substrate, extending in a first direction, and connected to each of the plurality of pixels, and wherein each of the first and second switching units is connected to the plurality of pixels through the plurality of data lines.

18. The display device of claim 17, further comprising:

a plurality of scan lines disposed on the substrate, extending in a second direction intersecting the first direction, and connected to each of the plurality of pixels.

19. The display device of claim 13, wherein the plurality of demultiplexers include at least one transistor.

* * * * *